United States Patent [19]

Saitoh et al.

[11] Patent Number: 4,965,016
[45] Date of Patent: Oct. 23, 1990

[54] GRANULAR CALCUIM HYPOCHLORITE COMPOSITION AND PROCESS FOR PREPARATION THEREOF

[75] Inventors: Hiroyuki Saitoh, Tokuyama; Tsugio Murakami, Shinnanyo, both of Japan

[73] Assignee: Tosoh Corporation, Yamaguchi, Japan

[21] Appl. No.: 266,865

[22] Filed: Nov. 3, 1988

[30] Foreign Application Priority Data

Nov. 6, 1987 [JP] Japan ................................. 62-279095

[51] Int. Cl.$^5$ ............................................... C01B 11/06
[52] U.S. Cl. ............................ 252/186.37; 252/187.28; 252/187.29; 423/474
[58] Field of Search ...................... 252/186.37, 187.27, 252/187.28, 187.29; 423/474

[56] References Cited

U.S. PATENT DOCUMENTS

| | | | |
|---|---|---|---|
| 1,713,654 | 5/1929 | Guyer | 423/474 |
| 3,498,924 | 3/1970 | Walsh et al. | 252/187.26 X |
| 3,953,354 | 4/1976 | Faust | 252/186.37 |
| 4,146,676 | 3/1979 | Saeman et al. | 428/403 |
| 4,197,284 | 4/1980 | Wojtowicz | 252/186.37 X |
| 4,201,756 | 5/1980 | Saeman | 252/186.37 X |
| 4,248,848 | 2/1981 | Murakami et al. | 423/474 |
| 4,328,200 | 5/1982 | Welch et al. | 423/474 |
| 4,337,236 | 6/1982 | Sakowski et al. | 252/187.28 X |
| 4,355,014 | 10/1982 | Murakami et al. | 252/186.37 X |
| 4,863,709 | 9/1989 | Saito et al. | 423/474 |

*Primary Examiner*—Richard D. Lovering
*Assistant Examiner*—John M. Covert
*Attorney, Agent, or Firm*—Nixon & Vanderhye

[57] ABSTRACT

A granular calcium hypochlorite composition comprising a particle of calcium hypochlorite dihydrate and/or calcium hypochlorite anhydride, the surface of which has been covered with a double decomposition product of calcium hypochlorite and an alkali metal hydroxide. This composition is prepared by adhering an aqueous alkali metal hydroxide solution to the particle of calcium hypochlorite dihydride or calcium hypochlorite anhydride, and the drying the particle.

9 Claims, No Drawings

GRANULAR CALCIUM HYPOCHLORITE COMPOSITION AND PROCESS FOR PREPARATION THEREOF

BACKGROUND OF THE INVENTION (1) Field of the Invention

The present invention relates to a granular calcium hypochlorite composition which does not decompose but remains stable even when stored for a long time or exposed to a high temperature, in which dusting does not occur, and which has an excellent solubility, and to a process for the preparation of this granular calcium hypochlorite composition (2) Description of the Related Art Calcium hypochlorite is a strong oxidizer and is a valuable compound widely used for sterilizing and disinfecting swimming pool water, water supply or drainage water and public bath water or the like, or as a bleaching agent for cotton, pulp or the like, because of its high sterilizing and bleaching effects.

A composition composed mainly of calcium hypochlorite is commonly called "high test hypochlorite", and the composition is marketed under the name of 65 wt.% or 70 wt.% high test hypochlorite in accordance with the available chlorine content.

The high test hypochlorite is formed into powders, granules, and tablets The granular product is obtained by granulating the powder, is easy to handle, is used for sterilizing or disinfecting swimming pool water or service water, and is consumed in a largest quantity.

High test hypochlorite generally comprises at least 65% by weight of calcium hypochlorite, 3 to 20% by weight of water, 2 to 10% by weight of calcium hydroxide, components incorporated in the preparation process, such as calcium chloride, calcium carbonate and calcium chlorate, and sodium chloride, as the diluent. The calcium hypochlorite composition undergoes little decomposition and has a high stability in the anhydrous state. But, abrupt decomposition will occur due to contact with a flame, spark, or an organic substance and the composition has a poor safety factor. To improve the safety, water is incorporated in an amount of 3 to 20% by weight, but the presence of water has an adverse effect on the stability of the calcium hypochlorite composition. Namely, the composition is easily decomposed if the water content is increased or the temperature is elevated. To maintain a good stability in the presence of this water, calcium hydroxide is incorporated as a stabilizer in an amount of 2 to 10% by weight. But the addition of calcium hydroxide exerts an undesired function of controlling the speed of dissolution of high test hypochlorite in water, and if calcium hydroxide is added in a large amount, dusting occurs and calcium hydroxide remains in the form of a water-insoluble residue. Furthermore, since calcium hypochlorite and calcium hydroxide are mixed together in the powdery state, various handling and preparation problems arise, for example, with regard to the mixing means and the homogeneousness of the formed mixture.

The main object of use of high test hypochlorite is to sterilize and disinfect swimming pool water and service water, and for this purpose, the high test hypochlorite composition is required to have preferred properties such that the safety and stability are high, dusting does not occur, the composition is promptly dissolved and no water-insoluble residue remains. But, as pointed out hereinbefore, the addition of calcium hydroxide is practically indispensable for improving the stability. Furthermore, since calcium hypochlorite is in the form of a fine powder, the granulation step of compression-molding the fine powder into a granular product is indispensable to prevent dusting, and since a hard granular product is formed by molding, the solubility is further reduced practically.

SUMMARY OF THE INVENTION

A primary object of the present invention is to provide a granular calcium hypochlorite composition, which exhibits a high stability even in the water-containing state or at a high temperature, does not cause dusting, has an excellent solubility, and has a very low content of a water-insoluble component.

Another object of the present invention, there is provided a process for preparing a granular calcium hypochlorite composition by which the above-mentioned granular calcium hypochlorite can be prepared in a very simple manner.

In one aspect of the present invention, there is provided a granular calcium hypochlorite composition comprising particles of at least one calcium hypochlorite compound selected from calcium hypochlorite dihydrate and calcium hypochlorite anhydride, the surface of which has been covered with a double decomposition product of calcium hypochlorite and an alkali metal hydroxide.

In another aspect of the present invention, there is provided a process for the preparation of a granular calcium hypochlorite composition, which comprises adhering an aqueous solution of an alkali metal hydroxide to particles of at least one calcium hypochlorite compound selected from calcium hypochlorite dihydrate and calcium hypochlorite anhydride, and then drying the particles.

DESCRIPTION OF THE PREFERRED EMBODIMENTS

The terms used in this specification will now be explained.

The term "a double decomposition product of calcium hypochlorite and an alkali metal hydroxide" denotes a mixture obtained by placing calcium hypochlorite in contact with an alkali metal hydroxide, and this mixture is often briefly called "a double decomposition product". The main component is usually a product obtained by the double decomposition reaction of both starting materials, but sometimes a part of the starting material remain unreacted, or a part of an alkali metal salt of hypochloric acid as one product is further decomposed and the obtained alkali metal chloride is occasionally contained. For example, a part of lithium hydroxide remain reacted, or a part of sodium hypochlorite is further decomposed to sodium chloride.

The term "a covering layer" denotes a layer of the double decomposition product in the granular product of the present invention.

Note, "calcium hypochlorite" used herein is a generic term indicating both "calcium hypochlorite dihydrate" and "calcium hypochlorite anhydride", unless otherwise stated.

In the granular calcium hypochlorite composition of the present invention, preferably the particles of calcium hypochlorite are covered with the double decomposition product so that the atomic ratio M/Ca of the alkali metal (M) in the covering layer to the calcium element (Ca) is from 0.01 to 0.30. If this atomic ratio is too low, below the above range, the stability is degraded, and if the atomic ratio is too high, exceeding the above range, the solubility is degraded. Most preferably, the atomic ratio is from 0.025 to 0.25.

The particles of calcium hypochlorite used as the base material for the granular calcium hypochlorite composition of the present invention are not particularly limited. Particles of calcium hypochlorite dihydrate and/or particles of calcium hypochlorite anhydride, obtained by drying the dihydrate particles, provide granular calcium hypochlorite compositions having an excellent safety and solubility. This granular composition preferably has a particle size of at least 50 microns, especially at least 100 microns, as determined along the axes a and b. Coarse particles having a size of at least 150 microns have a particularly excellent dusting-preventing property and are particularly preferable.

The granular product of the present invention can be advantageously prepared according to the process described below.

The starting particles of calcium hypochlorite are not particularly limited, but the use of coarse particles of calcium hypochlorite dihydrate described hereinafter and/or particles of calcium hypochlorite anhydride obtained by drying the dihydrate is especially preferred.

Coarse particles of calcium hypochlorite dihydrate can be prepared by a growth using, as the seed crystal, prismatic (including cylindrical shape, square prismatic shape, and square top double pyramidal shape) calcium hypochlorite dihydrate (in which the lengths of axes a, b and c satisfy the requirements of $0.5 \leq b/a \leq 2.0$ and $c/a \geq 1.5$ and the length of the axis c is at least 5 microns, and preferably, the requirement of $c/a \geq 3.0$ is satisfied and the length of the axis c is at least 10 microns). Prismatic calcium hypochlorite dihydrate can be prepared by crystallization in the presence of at least one kind of a crystalline medium selected from a carboxylic acid, an alkali metal salt of a carboxylic acid and a carbohydrate, as disclosed in U.S. Pat. No. 4,284,848. The so-prepared coarse particles of calcium hypochlorite dihydrate have a square top double pyramidal crystal or a cubic-like shape, in which the lengths of axes a and b are 10 to 1,000 microns and the length of the axis c is 20 to 200 microns.

The above-mentioned dihydrate is obtained in the form of a slurry. A wet cake obtained by filtering the slurry and, optionally, washing the filter cake with water or the like, or a dry particle obtained by drying the above wet cake to remove adhered water and/or, crystal water to form particles of the dihydrate and/or the anhydride, can be used. Furthermore, a mixture of the wet cake and the dry particle can be used. Preferably, the particle size (as determined along the axes a and b) is at least 100 microns, and particles having a size of at least 150 microns are especially preferable. Particles having such particle sizes can be obtained by classification and separation using a liquid cyclone for the slurry or by using a pneumatic classifier or a vibrating sieving machine for the dry particle. The starting material can be classified, but the classification can be carried out after the granular composition of the present invention has been prepared.

As the alkali metal hydroxide to be adhered to the particles of calcium hypochlorite, an aqueous solution of at least one alkali metal hydroxide selected from hydroxides of lithium, sodium and potassium can be used. The alkali metal hydroxide is preferably added in an amount such that the ratio of moles of the alkali metal hydroxide to gram atoms of the calcium element (Ca) in the particles of calcium hypochlorite is from 0.01 to 0.30. If the above-mentioned ratio is too low, below the above-mentioned range, the stability of the product is degraded, and if the above-mentioned ratio is too high, exceeding the above range, the solubility is degraded. Most preferably, the above-mentioned ratio is from 0.025 to 0.25.

The concentration of the aqueous solution of the alkali metal hydroxide is not particularly limited. The amount of the alkali metal hydroxide added is adjusted by the concentration and the liquid amount, so that the particle is not muddled on the addition of the aqueous solution and the particle and liquid are homogeneously dispersed. Generally, preferably the concentration is several to 50% by weight, and the aqueous solution is preferably added so that the particle/liquid weight ratio is from about 1/0.01 to about 1/0.3.

A conventional solid/liquid mixing machine can be used for the addition and mixing. For example, a Henschel mixer and a paddle mixer can be advantageously used. To attain a homogeneous solid/liquid dispersion, preferably the addition of the aqueous solution of the alkali metal hydroxide is effected by spraying. In view of the handling ease, preferably the mixing temperature is room temperature to 80° C.

After this particle/liquid dispersion, the mixture is dried by a drier. An apparatus capable of reducing the water content to 3 to 20% by weight in a short time and effecting a uniform drying is preferred as the drier. If the temperature is high and the drying time long, the decomposition is advanced in calcium hypochlorite and the content of available chlorine is reduced. Accordingly, preferably a fluidized drier, a paddle drier, a band drier and a rotary drier are used. Accordingly, a granular calcium hypochlorite can be prepared as the product.

Sodium chloride can be added as the diluent for adjusting the available chlorine content. Sodium chloride having a large particle size is preferred, and the addition and mixing of sodium chloride can be performed at an optional stage. For example, sodium chloride can be added to the starting materials or after the alkali treatment.

The thus-prepared granular product of the present invention can be directly used for the sterilization and disinfecting of swimming pool water and service water, as in case of conventional granular products. Furthermore, the granular product of the present invention can be used in the form of a tablet or the like after granulation or molding.

The effects of the present invention will now be described.

The granular calcium hypochlorite composition of the present invention comprises particles of calcium hypochlorite as the base, which are covered with the double decomposition product.

(1) The granular composition shows a very high stability when stored for a long time or exposed to a high temperature.

(2) The physical strength is very high and dusting does not occur during the preparation and handling, and adverse influences on the health of the human body can be avoided.

(3) Although the strength is high, the granular composition can be rapidly dissolved.

(4) When the granular composition is dissolved in water, the amount of the water-insoluble matter is very small and an accumulation of the undissolved residue does not occur, and therefore, clogging does not occur in a water supply pipe, a sand filter and the like.

(5) Since the preparation process is very simple, the manufacturing cost is drastically reduced.

The present invention will now be described in detail with reference to the following examples and comparative examples that by no means limit the scope of the invention. Note, all of "%" are by weight.

Preparation of Coarse Particles of Calcium Hypochlorite Dihydrate

A 1-liter crystallizing vessel provided with a stirrer was charged with 30 g of a 10% aqueous citric acid solution of, 112 g of calcium hydroxide, 239 g of a 48% aqueous sodium hydroxide and 449 g of water, and, while the mixture was maintained at 15° C., 201 g of chlorine gas was blown into the mixture at a rate of 150 g/hr l. The pH value at the point of termination of chlorination was 10.3. Calcium hypochlorite dihydrate having a substantially cylindrical shape, in which the lengths of axes a and b were 5 to 15 microns, the length of the axis c was 20 to 120 microns, and the ratio of c/a was about 7, was obtained, and the obtained product was used as the slurry of the cylindrical seed crystal. Note, the slurry concentration was 9.5%.

An aqueous solution comprising 4.1% of calcium hypochlorite [$Ca(ClO)_2$] and 35.8% of calcium chloride, a 40% aqueous calcium hydroxide slurry, chlorine gas and the above-mentioned slurry of the cylindrical seed crystal were continuously introduced at rates of 80 g/hr, 89 g/hr, 33 g/hr, and 8.4 g/hr, respectively, into a 1-liter cylindrical crystallizing vessel equipped with an overflowing tube and a stirrer, which was maintained at 30° C., whereby chlorination was effected. Simultaneously the slurry was withdrawn at a rate of 210 g/hr. An excellent cylindrical seed crystal was observed. The apparent residence time of the crystal in the vessel was 5 hours, and the operation was conducted for 45 hours to obtain a slurry of coarse calcium hypochlorite dihydrate particles having substantially a square top double pyramidal crystal shape, in which the lengths of axes a and b were 20 to 400 microns and the length of the axis c was 20 to 150 microns.

This slurry of the coarse calcium hypochlorite dihydrate was separated for 1 minute at 3,000 rpm by a basket type centrifugal separator, and the separated solid was washed for 2 minutes to obtain a washed cake comprising 69.0% of calcium hypochlorite, 1.0% of calcium hydroxide, 28.0% of water, and 0.8% of calcium chloride.

Note, water was used as the washing liquid, in an amount of 65% based on the washed cake.

EXAMPLE 1 (COMPARATIVE EXAMPLE 1)

The washed cake prepared according to the above-mentioned method was dried by a fluidized bed drier to remove water residue by evaporation and was classified by a 100-mesh (JIS standard) sieve, and an oversize product was recovered. The product comprised 75.7% of $Ca(ClO)_2$, 21.0% of water, 0.9% of $CaCl_2$, and 1.1% of $Ca(OH)_2$. This crystalline particle (hereinafter referred to as "primary dry particle") (1,000 g) was charged in a Henschel mixer, and 108 g of a 30% aqueous sodium hydroxide solution was sprayed at room temperature into the particle with stirring. The mixture was thoroughly homogenized and then dried by a fluidized bed drier to obtain 923 g of a granular product comprising 75.1% of $Ca(ClO)_2$, 11.9% of water, 1.3% of $CaCl_2$, 4.8% of $Ca(OH)_2$, and 5.2% of NaCl.

When the physical properties of the granular product were measured, the following results were obtained. Note, the data of Comparative Example 1 were obtained from a commercially available granular calcium hypochlorite having an available chlorine content of 70%.

|  | Example 1 | Comparative Example 1 |
|---|---|---|
| Stability (decomposition ratio, %) | 5.2 | 15.3 |
| Strength (powdering ratio, %) | 1.2 | 19.8 |
| Solubility (%, after 3 minutes) | 99.8 | 88.1 |

Methods of Measuring Physical Properties (1) Stability

A 100-ml glass bottle having a polymer lid having a gas-discharging cut was charged with 15 g of the granular product, and the bottle was allowed to stand for 6 days in a thermostat vessel maintained at 55 ±1° C. The reduction of the effective chlorine content was measured and the decomposition ratio was calculated from the measured value.

(2) Strength

A lidded cylindrical glass bottle having a capacity of 200 ml was charged with 30 g of the sieved granular product and 15 g of glass balls having a diameter of 1 mm, and the bottle was shaken for 10 minutes at 220 reciprocations per minute by a shaking machine (Universal Shaker KM supplied by Iwaki). The sample was classified by a 150-mesh sieve, the amount B (g) of particles passing through the sieve was measured, and the powdering ratio (%) was calculated according to the formula B/30.0×100.

(3) Solubility 60 g of the granular product was charged in a glass beaker (3 l) filled with 3 l of water maintained at 20±1° C., and the mixture was stirred by a magnetic stirrer (80 to 100 rpm) for 3 minutes. The amount S (g) of available chlorine in the liquid at this point was measured, and the amount St (g) of available chlorine at the time of complete dissolution was measured. The solubility (%) after 3 minutes was calculated according to the formula S/St×100.

EXAMPLE 2

In a Henschel mixed provided with a heating jacket, 1,000 g of the primary dry particle used in Example 1 was dried at 64° C. and dehydrated so that the amount was reduced to 885 g. Then, 127 g of a 10% aqueous potassium hydroxide solution was sprayed at room temperature on the obtained particle and thoroughly dispersed therein. The mixture was subsequently dried to obtain 869 g of a granular product, in which the available chlorine content was 83.0%, the water content was 8.4%, and the total hydroxide amount was 1.20 moles per kg.

When the physical properties of the granular product were measured, it was found that the stability (decomposition ratio) was 7.1%, the strength (powdering ratio) was 0.9%, and the solubility (after 3 minutes) was 99.5%.

EXAMPLE 3

A Henschel mixer was charged with 1,000 g of the above-mentioned washed cake, 43.0 g of a 45% aqueous sodium hydroxide solution was sprayed at room temperature on the washed cake, and the mixture was thoroughly stirred and uniformly dispersed. The mixture was transferred into an exterior heating type paddle drier, 91 g of a crystal of sodium chloride having a particle diameter of larger than 100 microns was added, and the mixture was dried to obtain 890 g of a granular product. The granular product was classified by a 150-mesh sieve, and 721 g of the oversize product was recovered.

The recovered product comprises 73.6 of $Ca(ClO)_2$, 7.6% of water, 3.1% of $Ca(OH)_2$, and 13.4% of NaCl. When the physical properties of the granular product were measured, it was found that the stability (decomposition ratio) was 8.9%, the strength (powdering ratio) was 0.8%, and the solubility (after 3 minutes) was 99.3%.

We claim:

1. A granular calcium hypochlorite composition comprising a particle of at least one calcium hypochlorite compound selected from the group consisting of calcium hypochlorite dihydrate and calcium hypochlorite anhydride, said particle having a structure in which the surface portion is substituted with a double decomposition product of calcium hypochlorite with an alkali metal hydroxide, said calcium hypochlorite dihydrate grown from seed crystals using, as the seed crystal, prismatic calcium hypochlorite dihydrate in which the lengths of axes a, b and c satisfy the requirements of $0.5 \leq b/a \leq 2.0$ and $c/a \geq 1.5$ and the length of the axis c is at least 5 microns, and said calcium hypochlorite anhydride is prepared by dehydrating particles of said calcium hypochlorite dihydrate.

2. A granular calcium hypochlorite composition as set forth in claim 1, wherein the atomic ratio M/Ca of the alkali metal element (M) in the surface covering layer of the double decomposition product of calcium hypochlorite and the alkali metal hydroxide to the calcium element (Ca) in the entire granular composition is from 0.01 to 0.30.

3. A granular calcium hypochlorite as set forth in claim 1, wherein the alkali metal hydroxide is at least one number selected from the group consisting of lithium hydroxide, sodium hydroxide and potassium hydroxide.

4. A process for the preparation of a granular calcium hypochlorite composition comprising a particle of at least one calcium hypochlorite compound selected from the group consisting of calcium hypochlorite dihydrate and calcium hypochlorite anhydride, said particle having a structure in which the surface portion is substituted with a double decomposition product of calcium hypochlorite with an alkali metal hydroxide, wherein said process comprises:

(1) adhering an aqueous alkali metal hydroxide solution to a particle of calcium hypochlorite compound selected from the group consisting of calcium hypochlorite dihydrate and calcium hypochlorite anhydride, and then (2) heating the calcium hypochlorite particles, wherein said calcium hypochlorite dihydrate is grown from seed crystals using, as the seed crystal, prismatic calcium hypochlorite dihydrate in which the lengths of axes a, b and c satisfy the requirements of $0.5 \leq b/a \leq 2.0$ and $c/a \geq 1.5$ and the length of the axis c is at least 5 microns, and said calcium hypochlorite anhydrite is prepared by dehydrating particles of said calcium hypochlorite dihydrate.

5. A preparation process according to claim 4, wherein the alkali metal hydroxide is at least one member selected from the group consisting of lithium hydroxide, sodium hydroxide and potassium hydroxide 6. A preparation process according to claim 4, wherein the alkali metal hydroxide (MOH) is used in an amount such that the ratio of moles of MOH to gram atoms of the calcium element (Ca) in the particles of the calcium hypochlorite compound is from 0.01 to 0.30.

7. A preparation process according to claim 4, wherein the size of the calcium hypochlorite compound particles is such that the axes a and b of the particles are at least 50 microns.

8. A preparation process according to claim 5, wherein the size of the calcium hypochlorite compound particles is such that the axes a and b of the particles are at least 50 microns.

9. A preparation process according to claim 6, wherein the size of the calcium hypochlorite compound particles is such that the axes a and b of the particles are at least 50 microns.

* * * * *